United States Patent

Klabunde

[15] 3,698,725
[45] Oct. 17, 1972

[54] HYDROSTATIC SEAL FOR ROTARY MACHINE TOOL SPINDLES

[72] Inventor: Steven Eldor Klabunde, Fond du Lac, Wis.

[73] Assignee: Giddings & Lewis, Inc., Fond du Lac, Wis.

[22] Filed: Jan. 13, 1971

[21] Appl. No.: 106,156

[52] U.S. Cl.....................................277/74, 277/94
[51] Int. Cl........B65d 53/00, F15j 15/16, F16j 15/34
[58] Field of Search.........................277/74 X, 81, 94

[56] References Cited

UNITED STATES PATENTS

| | | |
|---|---|---|
| 2,696,410 | 12/1954 | Topenelian, Jr............308/170 |
| 3,103,364 | 9/1963 | Macks et al. ................274/39 |
| 3,132,903 | 5/1964 | Webb............................308/9 |

Primary Examiner—Edgar W. Geoghegan
Assistant Examiner—Frank Susko
Attorney—Wolfe, Hubbard, Leydig, Voit & Osann

[57] ABSTRACT

A hydrostatic seal is provided for machine tool headstocks having rotary, or rotary and translatable, tool spindles. A pressurized air film is formed between opposite sides of a thrust ring and adjacent hydrostatic seal bearings, forming a substantially frictionless seal and preventing oil leakage from around the tool spindle.

13 Claims, 7 Drawing Figures

INVENTOR.
STEVEN ELDOR KLABUNDE,
BY
Wolfe, Hubbard, Leydig, Voit & Osann
ATTORNEYS.

INVENTOR.
STEVEN ELDOR KLABUNDE,
BY
Wolfe, Hubbard, Leydig, Voit & Osann
ATTORNEYS.

HYDROSTATIC SEAL FOR ROTARY MACHINE TOOL SPINDLES

This invention relates generally to rotary seals and more particularly concerns hydrostatic seals for use in machine tool headstocks having rotary, or rotary and translatable, tool spindles.

Machine tool designers have long been faced with a number of special problems concerning leakage of lubricating oil and other material through seals located in the annular clearance space between machine tool spindles, spindle sleeves and their support housings. Some seals presently in use are highly susceptible to wear. Others are susceptible to damage or breakage due to entry of contaminants such as dust, grit and cutting tool chips. In either event, there is resultant oil leakage which requires clean-up as well as replacement of lost fluid, and housekeeping chores which machine tool users are reluctant to accept in their machine shop operations.

The foregoing problems are aggravated in modern spindle headstock assemblies where relatively large quantities of oil under positive pressure are used to provide not only lubrication, but also assembly cooling and preloading of spindle bearings. Even when the machine is not being operated, oil may collect behind the seal with eventual leakage resulting.

Yet another problem is encountered in the use of seal assemblies having frictionally engaging parts such as resilient seal rings which engage the rotating surface of a spindle. Such friction contributes not only to the inevitable wear of the parts involved, with the resultant fluid leakage problems described, but also generates heat. This, in turn, tends to introduce distortions in the workpiece or headstock parts, which is unacceptable when highly precise machining is required.

It is therefore the general object of this invention to provide an improved seal between the spindle and housing of a machine tool headstock.

More specifically, it is an object of the invention to provide a seal between a spindle assembly and the housing of a machine tool headstock which will effectively prevent leakage of oil or cooling fluid from the headstock under any normal head of pressure that may build up behind the seal.

Another object is to provide a seal of the character set forth above which can be used with a variety of machine tool headstocks.

Another object is to provide a seal of the described character which will be affected by axial or radial runout during operation of the associated headstock.

Yet another object is to provide a seal of the described character which will not be damaged by dust, grit, chips or other contaminants and which will prevent their entry into the headstock interior.

Still another object of the invention is to provide a seal for a rotary tool headstock which generates little or no heat through frictional contact of relatively moving parts.

An additional object is to provide a seal for a headstock which will prevent fluid leakage even when the machine is not operating but when fluid has collected behind the seal so as to provide a static head pressure thereupon. A further object is to provide a hydrostatic seal requiring a relatively low volume of pressurized air for operation.

A related object is to provide a hydrostatic seal which will not pollute the surrounding environment with an oil spray under normal operating conditions.

Still another object of the invention is to provide an improved seal for a rotary machine tool headstock which is compact in its dimensions, reliable and rugged in its design, durable in operation, and relatively inexpensive to manufacture.

Other objects and advantages of the invention will become apparent upon reading the following detailed description and upon reference to the drawings, in which.

While the invention will be described in connection with an exemplary embodiment, it will be understood that it is not intended to limit the invention to that embodiment, On the contrary, it is intended to cover all alternatives, modifications and equivalents as may be included within the spirit and scope of the invention.

Figure 1:
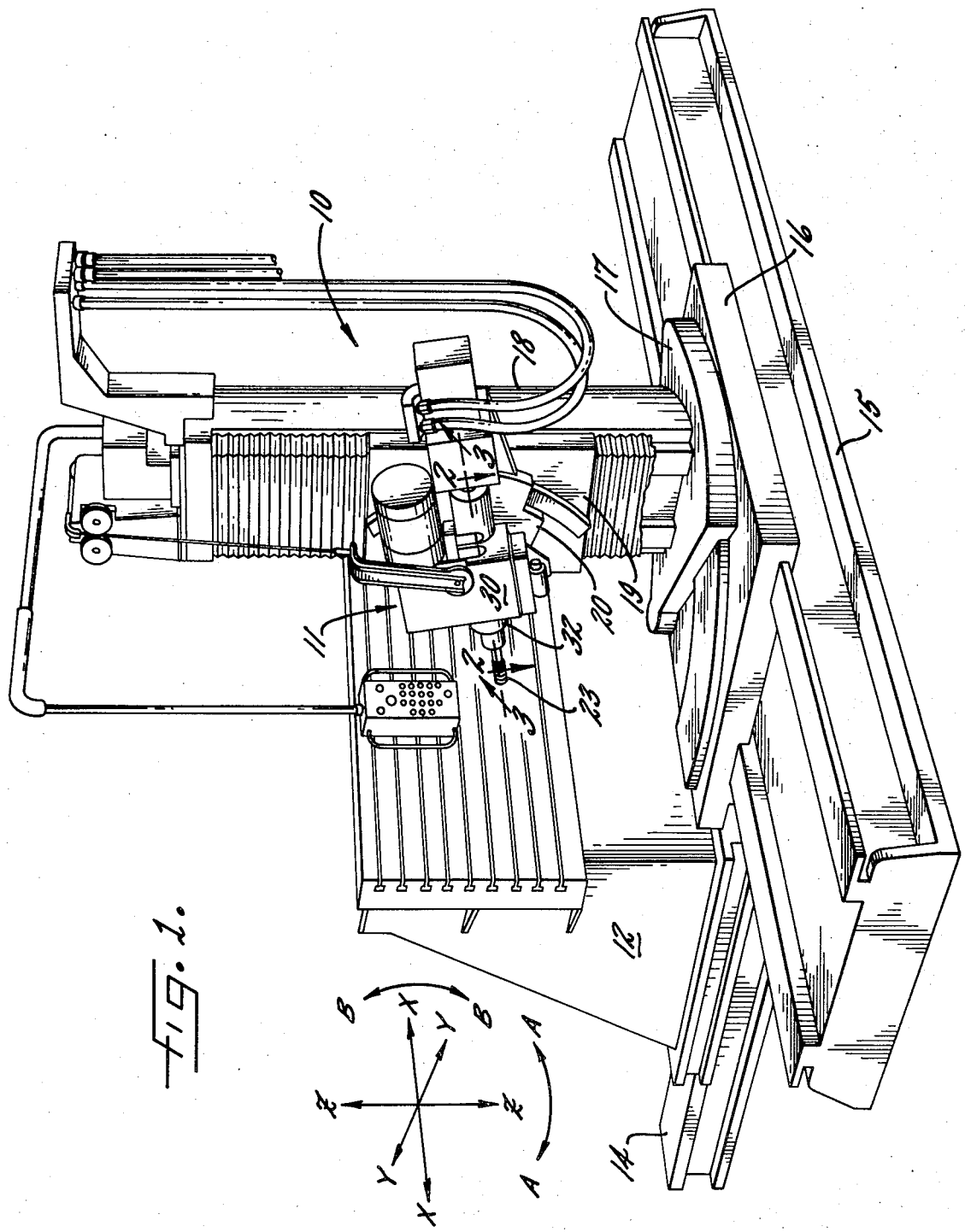
FIG. 1 is a perspective view of an illustrative machine tool containing the novel headstock seal embodying the present invention.

Turning first to FIG. 1, the invention is there exemplified in an illustrative machine tool 10 having a headstock 11 with a spindle mounted therein for rotational movement. The machine tool 10 happens in this instance to be a large contour milling machine such, for example, as the one described in U.S. Pat. No. Re. 26,393. It will be understood that the invention may be installed in other machine tools with equal facility. The illustrated machine tool 10 is adapted to engage a workpiece (not shown) secured to a relatively heavy work support 12 mounted upon a bed 14 adjacent the machine. The machine tool 10 comprises a relatively long fixed base 15 which carries a sliding base 16 adapted for movement along the fixed base 15. The sliding base 16, in turn, supports a swivel base 17 adapted to be shifted in an arcuate path along the top surface of the sliding base 16. Fixed to the top of the swivel base 17 is a column 18 which serves as a support for a vertical saddle 19. The latter is mounted for vertical sliding movement on the column and carries, in turn, a swivel saddle 20. The swivel saddle 20 supports the headstock 11 so as to permit arcuate movement of the latter in a vertical plane.

From the above, it will be seen that the headstock 11 is mounted for movement on five axes relative to the workpiece. Such movement includes translation on three coordinate axes X, Y and Z and swivel motion about horizontal and vertical axes A and B, thereby permitting the headstock 11 and its cutting tool 23 to be oriented in any desired position relative to the workpiece. Movements of the headstock 11 and the cutting tool 23 carried thereupon may be controlled through numerical control equipment (not shown) in a well known manner.

Figure 2:
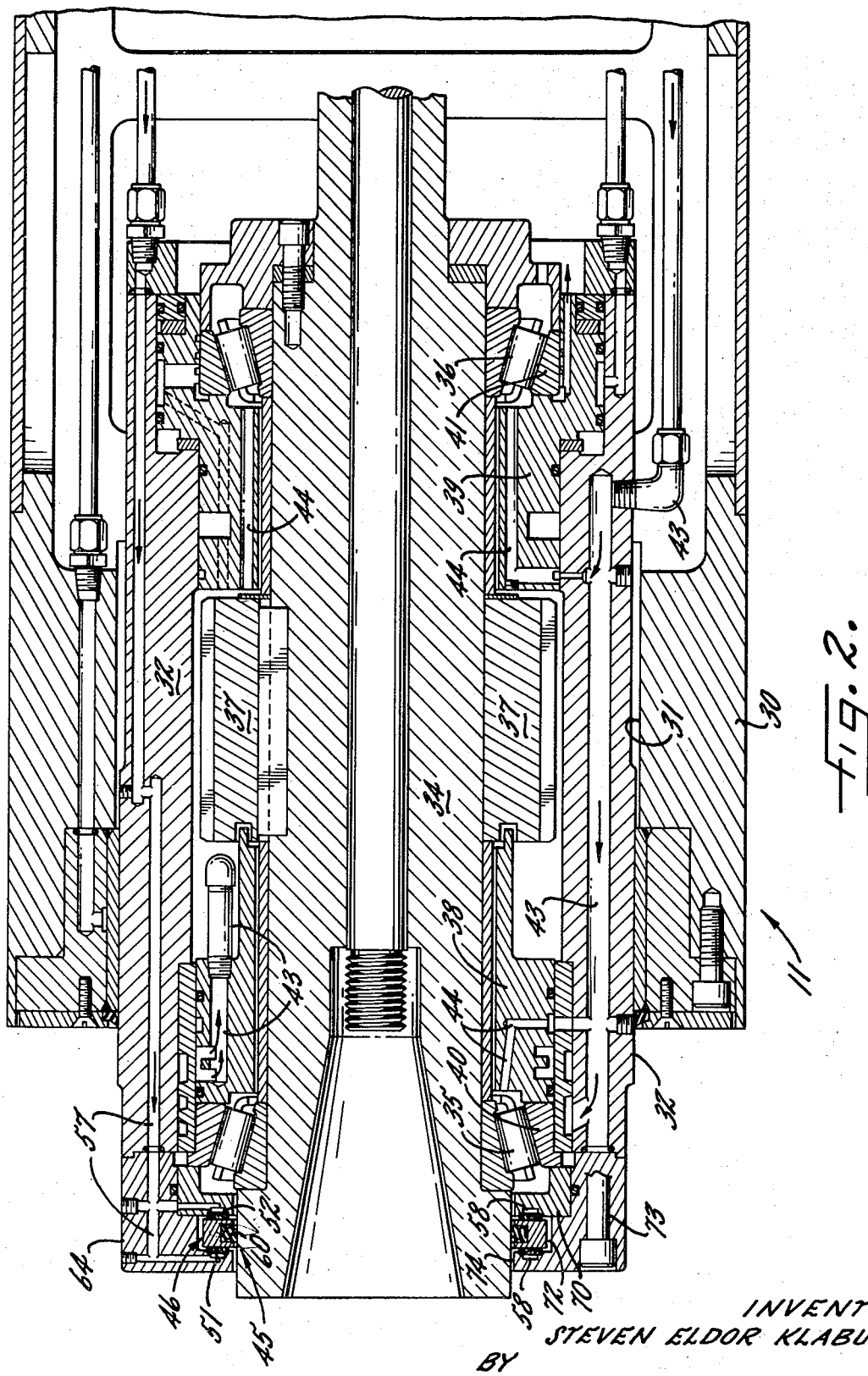
FIG. 2 is an enlarged fragmentary sectional view taken axially of the spindle and substantially in the plane of the line 2—2 in FIG. 1 showing a portion of the headstock with the seal incorporated therein.

As best seen in FIG. 2, the headstock 11 includes a housing 30 having a bore 31 therein. Within the bore 31, a cylindrical quill 32 is supported. A spindle is journalled for rotation within the quill 32 by anti-friction bearings 35 and 36, and is driven by a bull gear 37. To support the spindle 34 with great precision even under heavy cutting loads and low spindle rotational speeds, the spindle bearings 35 and 36 may be preloaded to prevent vibration and chatter as the tool engages the workpiece. This bearing preloading is described in U.S. Pat. No. 3,211,060. Briefly, the bearing preload piston 39 is selectively urged by fluid pressure either to the right or to the left to apply either a relatively light or a relatively heavy preload to the bearings 35 and 36.

To provide cooling for the headstock parts, refrigerated oil is circulated through the oil lines and passages 43, in the general direction indicated by arrows. The large quantities of pressurized and refrigerated oil so circulated also provide lubrication for the spindle bearings 35 and 36 through the lubrication passages 44.

It will thus be appreciated that, when the machine tool 10 containing the novel seals is in operation and spindle 34 is rotating, relatively large quantities of pressurized hydraulic fluid and pressurized lubricating and cooling oil may be circulated through the headstock 11. When the headstock 11 is rotated into an inclined position so that the front bearing 35 is located at a lower position than the rear bearing 36, quantities of fluid may collect adjacent the lower bearing 35, creating a head of static fluid pressure in the lower or front portion of the headstock. Such fluid collection and static head development may occur even though the hydraulic and oil pressurization systems are not in operation.

In accordance with the invention, a novel hydrostatic seal 45 is presented and is installed so as to prevent the leakage of fluids from the headstock 11. The seal also prevents the entrance of dust and workpiece chips from entering into the headstock interior and is essentially frictionless in operation.

The hydrostatic seal 45 includes an annular thrust element 46 (FIGS. 2–4) fixed to the spindle 34 for rotation bodily therewith. The illustrated thrust element 46 is of generally rectangular cross section, and is provided with two side surfaces 47 and 48 extending normally and radially above the spindle surface 49. The hydrostatic seal 45 also includes, in addition to the thrust element, two stationary opposing porous seal bearings 51 and 52 located on opposite sides of the thrust element and closely adjacent the radial surfaces 47 and 48 thereof. These endless annular seal bearings are preferably formed of porous graphitic carbon which, in the present instance, has a permeability of about 25,000 microdarcies. Such graphitic carbon is self-lubricating and is resistant to clogging, owing to the large number of individual air passages formed therein. Material of this type is commercially available from the Pure Carbon Company of St. Marys, Pa., under the trade name Purebon P-2W. In the illustrated embodiment of the invention, the bearings 51 and 52 are securely bonded to the surrounding support structure 64 in any convenient manner which will prevent leakage of air around the peripheries 51 $a$ and 52$a$, respectively, of the bearings 51 and 52.

Figure 4:
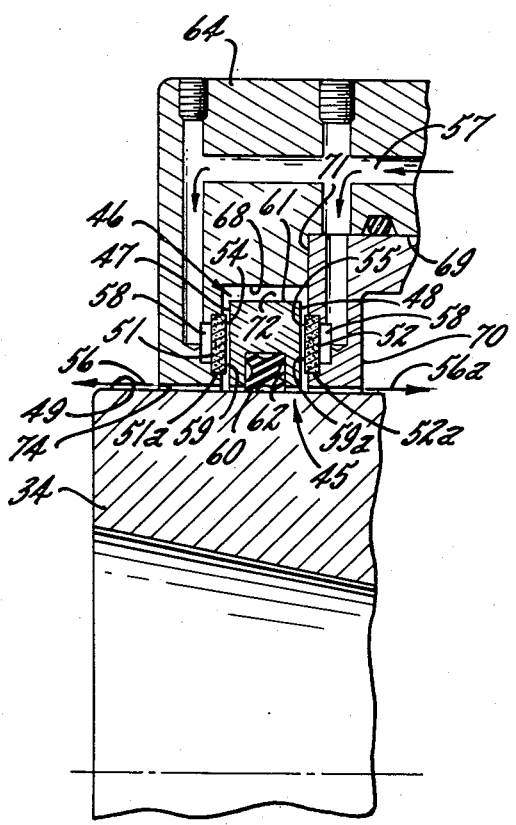
FIG. 4 is a further enlarged fragmentary sectional view similar to FIG. 2 and taken substantially in the plane of the line 2—2 in FIG. 1 showing the seal elements in greater detail.
Figure 5:
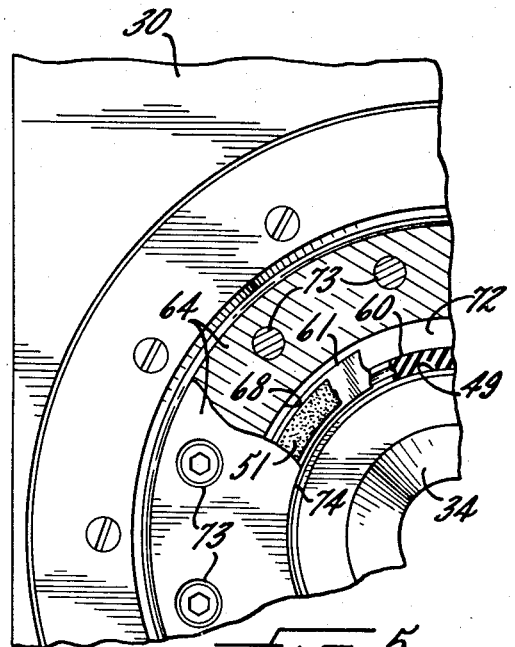
FIG. 5 is a fragmentary view of the headstock front showing, in a broken-away form, parts of the headstock and seal.

In further accordance with the invention, means are provided for supplying pressurized air through the porous hydrostatic seal bearings, thereby creating and maintaining thin, continuous annular pressurized air films in the clearance spaces 54 and 55 between the bearing 51 and thrust element side surface 47, and between the bearing 52 and thrust element side surface 48, respectively, as seen particularly in FIG. 4. In the illustrated embodiment of the invention, the means for supplying the pressurized air includes an air pressure source (not shown) and the air passage 57. The air passage 57 communicates with a pair of annular passages 58 for distribution of pressurized air to the rear of each porous seal bearing 51 and 52; the delivered pressurized air seeps through the seal bearings 51 and 52 to form the described air film in the spaces 54 and 55. These thin annular air films are of equal pressure and serve to effectively seal the headstock so as to prevent the leakage of oil along the spindle surface and past the thrust element 46. Moreover, external contaminants such as dust, cutting fluids, and workpiece chips are excluded from entering the headstock by the exhaust flow of air in the direction indicated by the arrows 56 and 56$a$ and by the pressurized film of air.

Experimentation has shown that, to provide relatively ideal sealing conditions, the thrust element 46 and seal bearings 51 and 52 should be spaced apart from each other by a predetermined distance. A distance of about 0.00045 to 0.00050 inches between the surfaces 47 and 48 of the thrust element 46 and the adjacent seal bearing surfaces 59 and 59$a$ provide effective sealing.

Experimentation has further shown that spacing distances of from 0.00035 inches to about 0.00150 inches can provide satisfactory sealing. These small distances are in part accurately obtained by finishing the adjacent surfaces 47, 48, 59, 59$a$ of both the thrust element 46 and the seal bearings 51 and 52 to a surface tolerance of ±0.0002 inches, both parallel and flat, after the bearings have been bonded to the surrounding support structure 53. To prevent passage or seal bearing clogging and resultant seal malfunctions, it is recommended that filtered and dehydrated compressed air be supplied at a standard shop pressure of between 60 and 120 psi; 100 psi has been found to provide good operating results.

Figure 3:
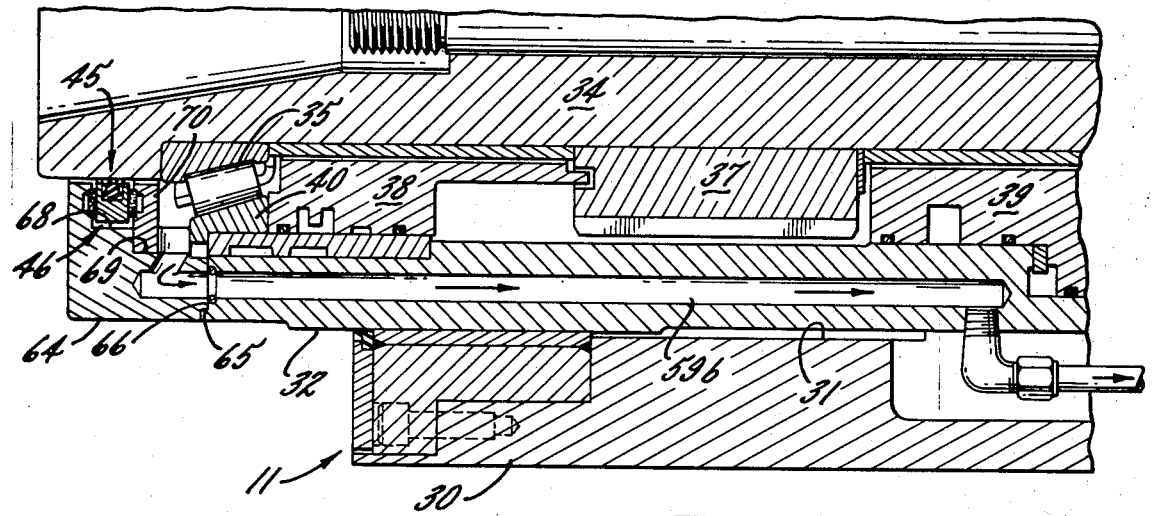
FIG. 3 is an enlarged fragmentary sectional view taken substantially in the plane of the line 3—3 of FIG. 1 showing the vacuum scavenger line.

Return of oil from the vicinity of the air film is accomplished by the scavenger line 50$b$ shown in FIG. 3. It is a feature of the invention that little or no leakage will occur through the seal assembly if the pressurized air supply is accidentally or purposely disconnected even though oil surrounding the seal is under a head of pressure. In such a circumstance, the pressurized air film will dissipate but, the relatively small clearances by the opposed surfaces of the seal provide resistance to passage of oil. In addition the carbon graphite seal bearings 51 and 52 will become saturated with oil causing additional resistance to leakage. Further, in the event that the air supply to the seal is terminated, only slight frictional forces will be encountered since the carbon graphite bearings retain their lubricating qualities.

As an alternate construction, the seal bearing members 51 and 52 may be formed of suitable non-porous material perforated to provide the requisite overall permeality of about 25,000 microdarcies so as to allow generation and maintenance of the sealing air cushions.

In accordance with a further aspect of the invention, the thrust element may, if desired, be constructed to be capable of axial motion along the spindle surface 49. To these ends, the thrust element 46 illustrated in FIGS. 2-5 comprises an annular resilient sealing member such as a quad-ring 60 of substantially rectangular cross-sectional shape and an annular thrust ring 61 surrounding the quad-ring sealing member 60. To provide a firm sealing seat for the quad-ring 60, the thrust ring 61 is provided with an annular groove 62 of substantially rectangular cross-sectional shape. The seal element engages the surface 49 of the spindle along one of its four sides, and wipes the surface clean of oil or other material when the quad-ring 60 and thrust ring 61 are together forced axially along the spindle 34. The necessity for accurately locating the thrust element axially upon the spindle 34 is also eliminated, since this seal connection permits the thrust ring 61 to be axially positioned to conform to the surrounding structure during assembly of the device. The seal connection also permits relative motion between the thrust ring 61 and the spindle 34 after assembly and during use, such as may be experienced due to relative expansion of the headstock components, spindle bearing wear, and changes in the spindle bearing preload.

It is a feature of the invention that the interior diameter of the thrust ring 61 is about 0.001 inches larger than the adjacent diameter of the spindle 34, thereby providing a sealing effect between the thrust ring and spindle itself, and preventing damage to the seal element 60 by impingement of foreign matter such as dust and chips thereupon.

Assembly and retention of the described seal 45 upon a headstock (FIGS. 2-4) is easily accomplished. A seal housing 64 is formed with a cylindrical pilot surface 65 which surface 65 is adapted to mate with a counterbore 66 so as to center the housing 64 relative to the axis of the headstock 11. The seal housing 64 is formed with concentric counterbores 68 and 69. A generally annular ring 70 is located within the counterbore 69, and is provided with a radial face 71 opposing and spaced from the other counterbore 68, thereby forming a generally rectangular annular recess 72 into which the seal assembly fits. The seal housing 64 is retained upon the quill by a plurality of bolts 73 which are threaded into the quill and tightened into place with equal torque, thereby obtaining and assuring equal cross-sectional dimensions for all parts and part clearances in the seal assembly. The most interior bore 74 FIGS. 4,5) of the seal housing 64, through which the spindle 34 projects, is preferably from 0.004 to 0.006 inches larger than the adjacent diameter of the spindle 34 itself, thereby providing a preliminary sealing effect against the entrance of chips or other foreign matter into the seal assembly and headstock interior.

Figure 6:
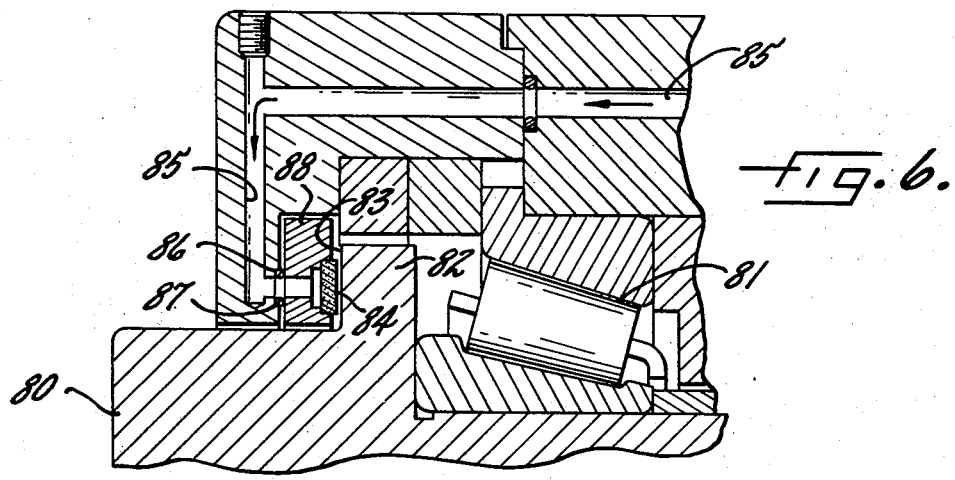
FIG. 6 is an enlarged fragmentary sectional view similar to FIG. 4 and showing an alternate embodiment of the invention.

An alternate embodiment of the invention is illustrated in FIG. 6, wherein is included a spindle 80 mounted in a bearing 81 for rotational movement only. Formed upon the spindle 80 is a flange 82 having a side surface 83 for cooperation with a porous annular seal bearing 84. Air is supplied to the rear of the bearing 84 through appropriate passages 85 to form the sealing air film in the manner described above. To provide a continuous seal for these passages 85, seals 86 and 87 of a diameter larger than the diameter of the spindle 80 are provided, and bear against the housing 64 and bearing support 88.

Figure 7:
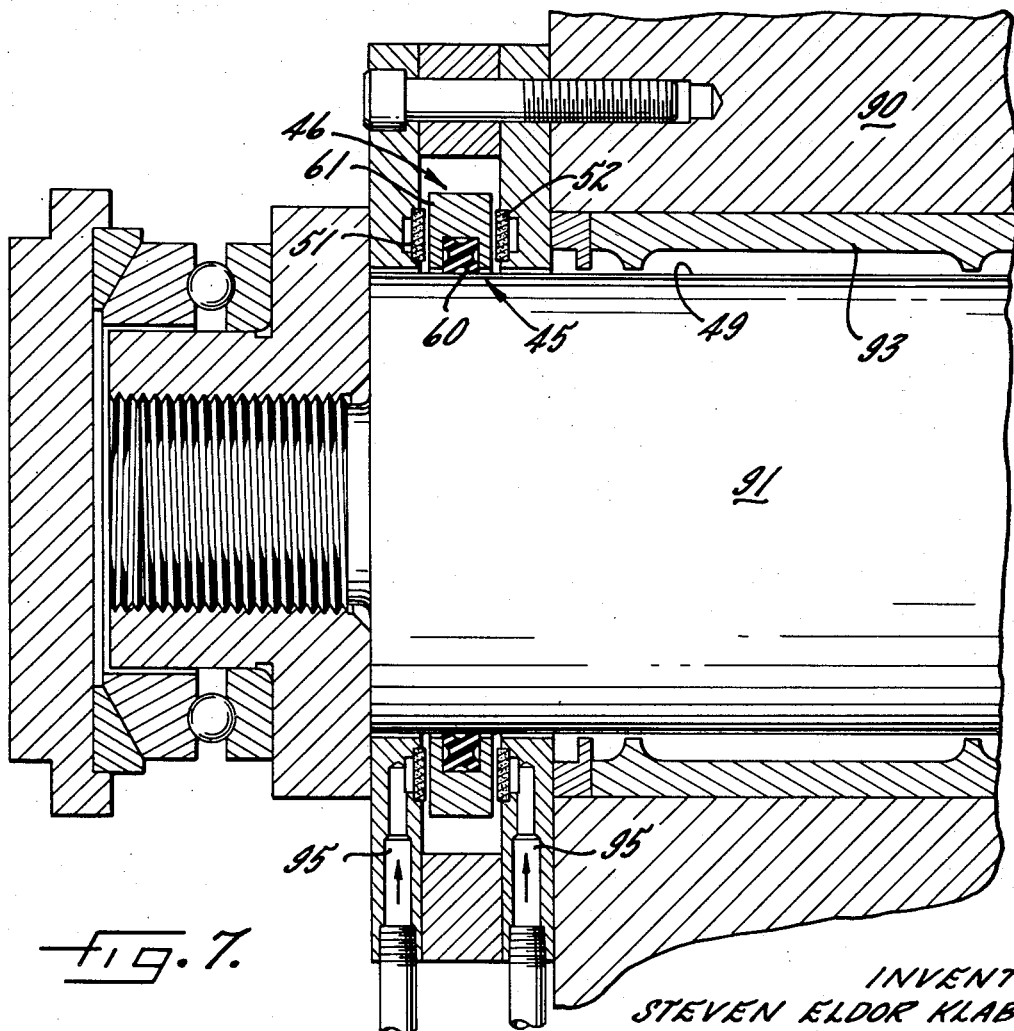
FIG. 7 is a sectional view similar to FIG. 2 but showing the headstock seal as used in a headstock having an axially extensible spindle.

In accordance with another aspect of the invention, the novel hydrostatic seal 45 may be conveniently mounted for use in a headstock 90 equipped with a spindle 91 which is mounted for relatively extended axial motion as shown in FIG. 7. In the illustrated headstock 90, the spindle 91 is supported for both rotary and axial movement by hydrostatic bearings 93. The axial traverse movement of the spindle 91 is used in drilling, boring, tapping and like operations. When the spindle 91 is extended or moved to the left the thrust element 46, comprising the sealing member 60 and thrust ring 61 rides over the spindle surface 49 as described above, and maintains its relative position between the bearings 51 and 52. Pressurized air is delivered to the seal by convenient means as though appropriate hosing and taps 95. Assembly of the seal 45 in this or other headstocks may be accomplished in a manner similar to that used in connection with the typical headstock 45 illustrated in FIGS. 2-5.

I claim as my invention:

1. In a machine tool having a head stock, a spindle, and means rotatably supporting the spindle within the head stock, a hydrostatic seal preventing the flow of liquid between said spindle and spindle support means, said seal comprising an annular thrust member extending radially outward from said spindle, said thrust member being formed with at least one bearing surface, a nonrotatable porous hydrostatic seal bearing mounted within said spindle support means, said porous bearing having at least one bearing surface in closely spaced relation to said thrust member bearing surface, and means for supplying pressurized air through the porous hydrostatic seal bearing to provide an air cushion between the closely spaced surfaces of said bearing and thrust member with a pressure sufficient to prevent leakage of liquid along the spindle past the thrust member.

2. In a machine tool having a head stock, a spindle, and means rotatably supporting the spindle within said head stock, a hydrostatic seal preventing the flow of liquids between said spindle and said spindle support means, said seal comprising an annular thrust member mounted upon said spindle for rotation therewith and having surfaces extending normally and radially outward from the spindle, a pair of nonrotatable porous hydrostatic seal bearings mounted within said spindle support means on opposite sides of said thrust member, said porous seal bearings each having a surface which is closely adjacent one of said radial thrust member surfaces, and means for supplying pressurized air through the porous hydrostatic seal bearings to provide two opposing annular air cushions of substantially equal pressure and dimensions between each porous bearing and the respective thrust member surface which creates a substantially frictionless seal between said thrust member and said bearings and prevents liquid from flowing along the spindle past the thrust member.

3. A device according to claim 2 wherein the thrust member comprises an annular grooved thrust ring and an annular sealing member sealingly seated within the groove and engaging the surface of said spindle.

4. A device according to claim 2, wherein the thrust member comprises an annular resilient, quad-ring sealing member of substantially rectangular cross-sectional shape contacting said spindle along one side of said rectangle, and an annular thrust ring of substantially rectangular cross-sectional shape surrounding the sealing member on its remaining three cross-sectional sides.

5. A device according to claim 4, wherein said thrust ring and said spindle are spaced apart from each other by said seal member by a distance of about 0.001 inches.

6. A device according to claim 2, wherein said thrust member may be moved for a limited distance in an axial direction along the surface of said spindle.

7. A device according to claim 2, wherein said hydrostatic seal bearings are formed of porous graphite carbon having a permeability of about 25,000 microdarcies.

8. A device according to claim 2, wherein said hydrostatic seal bearings are formed of porous material having an overall permeability of about 25,000 microdarcies.

9. A device according to claim 2, wherein said hydrostatic seal bearings are endless and annular in shape.

10. A device according to claim 2, wherein said air supply means provides air to said hydrostatic seal bearings at a pressure in the range from about 60 psi to about 120 psi.

11. A device according to claim 2, wherein said thrust member and said seal bearings are spaced from each other by a distance in the range from about 0.00035 inches to about 0.00150 inches.

12. A device according to claim 2, wherein said thrust member and said seal bearings are spaced from each other by a distance in the range from about 0.00045 inches to about 0.00050 inches.

13. A hydrostatic seal for machine tool spindle headstocks, comprising the combination of a rotatable spindle and a spindle support means, an annular thrust member mounted upon the spindle for rotation therewith and having bearing surfaces extending normally and radially with respect to said spindle, stationary porous hydrostatic seal bearings fixed to said spindle support means and having bearing surfaces located closely adjacent the bearing surfaces of the thrust member, and means for supplying pressurized air through said porous hydrostatic seal bearings to provide air cushions between the bearings and thrust member surfaces which prevents the leakage of liquids from between said spindle and spindle support means.

* * * * *